United States Patent [19]
Hay

[11] Patent Number: 5,551,553
[45] Date of Patent: Sep. 3, 1996

[54] ANGLED DISK DRIVE APPARATUS FOR TRANSPORTING AND METERING PARTICULATE MATERIAL

[75] Inventor: Andrew G. Hay, Santa Monica, Calif.

[73] Assignee: Stamet, Inc., Gardena, Calif.

[21] Appl. No.: 88,620

[22] Filed: Jul. 6, 1993

Related U.S. Application Data

[63] Continuation of Ser. No. 929,880, Aug. 11, 1992, abandoned.

[51] Int. Cl.[6] ................................................. B65G 29/00
[52] U.S. Cl. .......................... 198/624; 198/642; 406/71; 415/90
[58] Field of Search ..................... 198/624, 642, 198/723; 415/90; 406/52, 71, 96, 99

[56] References Cited

U.S. PATENT DOCUMENTS

| | | | |
|---|---|---|---|
| 2,427,659 | 9/1947 | Collyer | 198/723 |
| 4,516,674 | 5/1985 | Firth . | |
| 4,768,920 | 9/1988 | Gurth . | |
| 4,773,819 | 9/1988 | Gurth . | |
| 4,988,239 | 1/1991 | Firth | 198/642 |
| 5,051,041 | 9/1991 | Firth . | |

*Primary Examiner*—Joseph E. Valenza
*Attorney, Agent, or Firm*—Loeb & Loeb LLP

[57] ABSTRACT

An apparatus is described for transporting particulate material. A housing includes a wall defining an inlet and a wall defining an outlet spaced downstream from the outlet. A duct is enclosed in the housing between the inlet and outlet, the duct being formed between first and second substantially opposed drive walls moveable relative to the housing from the inlet toward the outlet and at least one arcuate wall extending between the inlet and the outlet. The drive walls have a greater surface area for contacting the solid material than the arcuate walls. The drive walls rotate relative to an axis. An assembly is provided for positioning the second drive wall in the housing for rotation in a plane at an angle relative to the axis such that the distance between the first and second drive walls adjacent the inlet is greater than the distance downstream from the inlet when the drive walls are moving.

31 Claims, 5 Drawing Sheets

ANGLED DISK DRIVE APPARATUS FOR TRANSPORTING AND METERING PARTICULATE MATERIAL

This is a continuation of application Ser. No. 07/929,880 filed on Aug. 11, 1992, now abandoned.

BACKGROUND OF THE INVENTION

1. Field of the Invention

The present invention relates generally to apparatus and methods for transporting and metering particulate material. More particularly, the present invention is directed to a particulate material handling device which can be used to both transport and meter either large or small amounts of solid material of a great range of sizes.

2. Description of Related Art

A wide variety of equipment has been used to either transport or meter particulate material. Such transport equipment includes conveyor belts, rotary valves, lock hoppers, screw-type feeders, etc. Exemplary measurement or metering devices include weigh belts, volumetric hoppers and the like. In order to provide both transport and metering of particulate material, it is generally necessary to combine or incorporate both types of devices into a system.

One or more of the above identified transport or metering devices may be used in a solids transport system, depending upon a wide variety of parameters. For example, the amount, size and type of particulate material to be transported must be taken into consideration. The distance over which the solids are to be transported and variations in the surrounding pressure during transport must also be taken into account. The various transport and metering systems which are presently in use all have a variety of advantages and disadvantages which limit their performance in transporting or metering a wide variety of particulate types. It would be desirable to provide a single unit which is capable of simultaneously transporting and metering a wide variety of particulate materials under both ambient and pressurized conditions.

Large scale transport and/or metering of coal presents unique problems. A transport apparatus or system which is suitable for transporting one type of coal may not be suitable for transporting a different type of coal. For example, Kentucky coals maintain reasonable integrity when transported through conventional devices such as screw feeders and conveyor belts. However, Western United States coals tend to be more friable and may be degraded to a significant degree during normal transfer operations. It would be desirable to provide an apparatus which is capable of transferring all types of coal with a minimum amount of degradation.

The water content of the particulate solids is another factor which must be considered when designing any transport system. Many transport devices which are suitable for transporting completely dry particles do not function properly when the moisture content of the particulate material is raised. The same is true for particulate metering devices. Conventional metering devices which are designed to measure dry particulates are not well suited to meter moist solids. It would be desirable to provide a transport apparatus which is capable of moving and/or metering particulate solids regardless of their moisture content.

There are also many instances in which it is desirable to transport and meter particulate materials against pressure. It would be desirable to provide an apparatus which is capable of simultaneously pumping and metering under both ambient pressure conditions and against a pressure head caused either by entry into a pressurized system or transport of the particulate material upward against gravity.

It is apparent from the above background that there is a present need for a solids handling or pumping device which operates as a single unit to provide simultaneous transport and metering of particulate material. The unit should be capable of transporting and metering a wide variety of particle types under a wide variety of conditions. Further, the unit should be structurally strong, and mechanically simple and durable so that it can be operated continuously over extended periods of time without failure.

SUMMARY OF THE INVENTION

In accordance with the present invention, an apparatus and method is provided for transporting and metering particulate materials with increased efficiency and reliability. The solids pump of the present invention is useful in transporting a wide range of particulate materials, including both small and large particulates and mixtures of them, having varying degrees of moisture content. The solids pump operates as a valveless positive displacement pump which provides accurate metering of particulates as well as transport under ambient conditions and against pressure.

The solids pump of the present invention includes a housing having a wall defining an inlet and a wall defining an outlet spaced downstream from the inlet. A duct is enclosed within the housing between said inlet and outlet, the duct being formed between first and second substantially opposed friction drive walls movable relative to said housing from said inlet toward said outlet and at least one arcuate wall extending between said inlet and said outlet. The friction drive walls have a greater surface area for contacting said solid material than the arcuate walls. Means are provided for rotating the friction drive walls relative to an axis. Means are also provided for positioning the second friction drive wall in the housing for rotation in a plane at an angle relative to the axis such that the distance between the first and second friction drive walls adjacent the inlet is greater than the distance downstream from the inlet when the friction drive walls are moving. The distance between the first and second friction drive walls adjacent the inlet in essence constitutes a divergence while the distance downstream constitutes a convergence such that the convergence forms a reduction in the cross-sectional area of the duct. Therefore, the cross-sectional area of the duct at the inlet is greater than a cross-sectional area of the duct downstream from the inlet, between the inlet and the outlet.

Choking of particulate material within the pump duct provides a uniform and positive displacement of solids through the duct which is well suited for both transporting and metering the particulate material under a variety of conditions.

With this apparatus, a wide variety of particulate material may be transported and metered through a duct or passage way by friction forces developed when the particles are bridged by compression as they are transported between the inlet and the outlet. The bridging of material occurs when the material enters an area of reduced cross-section forming a convergence or choke. The bridge formed by the material allows friction forces created by rotation of the friction drive walls to carry the bridged material toward the outlet.

In one form of the invention, the angle at which the second friction drive wall rotates in the housing can be varied to allow fine tuning of the apparatus for different types of material being transported. Variation of the angle modifies the rate of change of the cross-sectional area one point and another downstream point between the inlet and the outlet to have a different convergence or choke in the duct.

In another form of the invention, the duct is further defined by the outer edge of the rotor disks, rotatable within the housing, and a radially exterior arcuate wall stationary during operation with respect to the outer edges of the rotor disk. Alternatively, the arcuate wall may be positioned between the friction drive walls, adjustable in its radial distance from the central hub of the apparatus. The wall may also be formed from multiple elements, which can also be adjusted radially inward and outward with respect to the rotor disks to vary the cross-sectional area and therefore the convergence of the duct.

The uniform and constant flow rate provided by the apparatus in accordance with the present invention makes it particularly well suited for use as a metering device. The volume of particulate material being delivered is conveniently and accurately determined by measuring the rotational speed of the moving walls defining duct and relating this to the cross-sectional area of the duct. During metering operations, conventional monitoring equipment may be included to ensure that the passageway is full of solids during the metering process.

The above discussed and many other features and attendant advantages of the present invention will become better understood by reference to the following detailed description when considered in conjunction with the accompanying drawings.

DETAILED DESCRIPTION OF THE PREFERRED EMBODIMENTS

In accordance with the present invention, the apparatus described provides for transporting and metering particulate materials with increased efficiency and reliability. It may be used for transporting a wide range of particulate materials, including both small and large particulates and mixtures of them, having varying degrees of moisture content. In one preferred embodiment, one friction drive wall of a paired friction drive wall rotor is slanted at an angle with respect to the other friction drive wall. This arrangement is a modification of the device shown in U.S. Pat. No. 4,988,239, incorporated herein by reference, having parallel friction drive walls. That parallel configuration of solids pump is described more fully in that patent.

Figure 1:
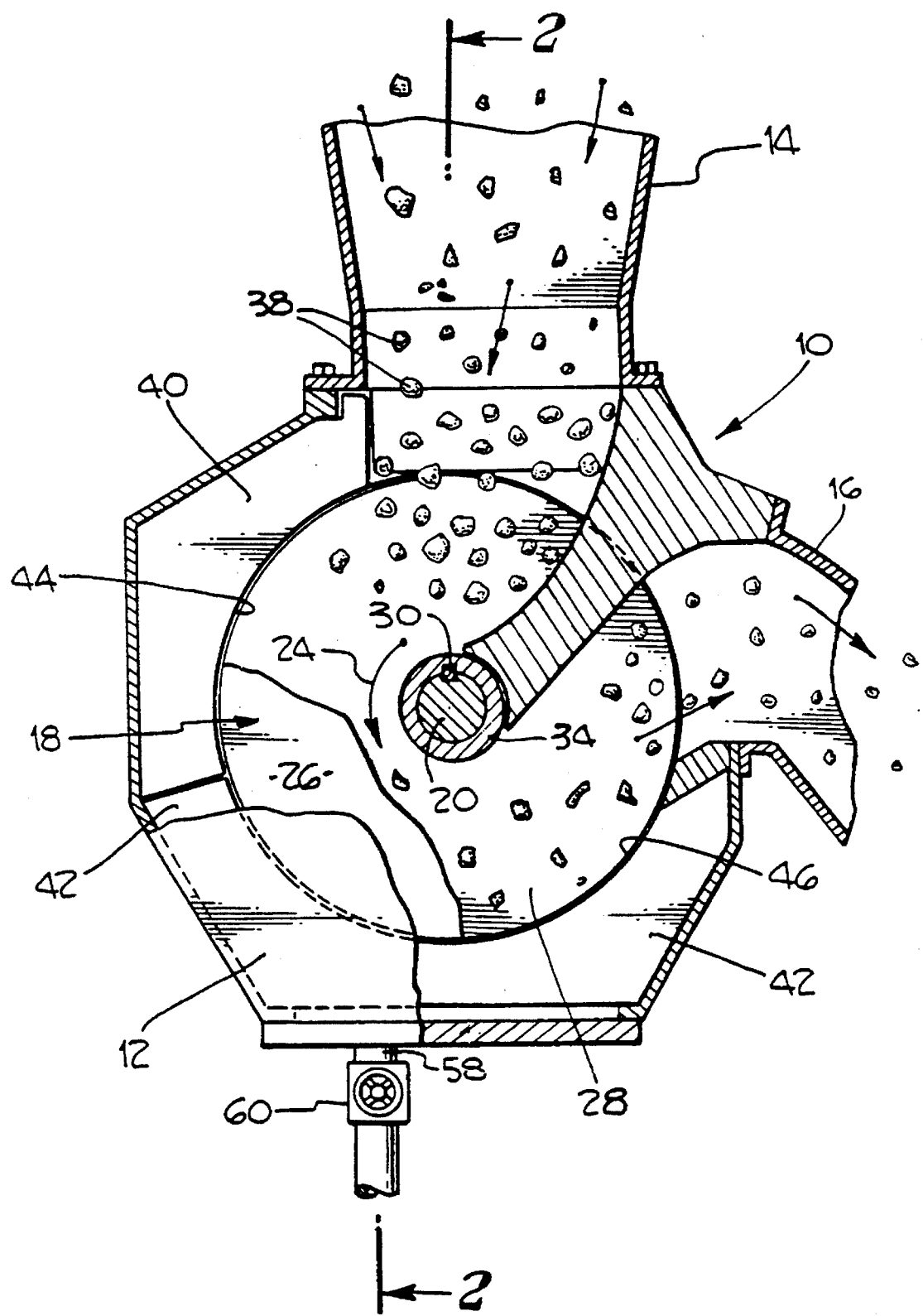
FIG. 1 is a partial transverse sectional and cut away view of a first preferred exemplary solids pump for use in accordance with the present invention.
Figure 2:
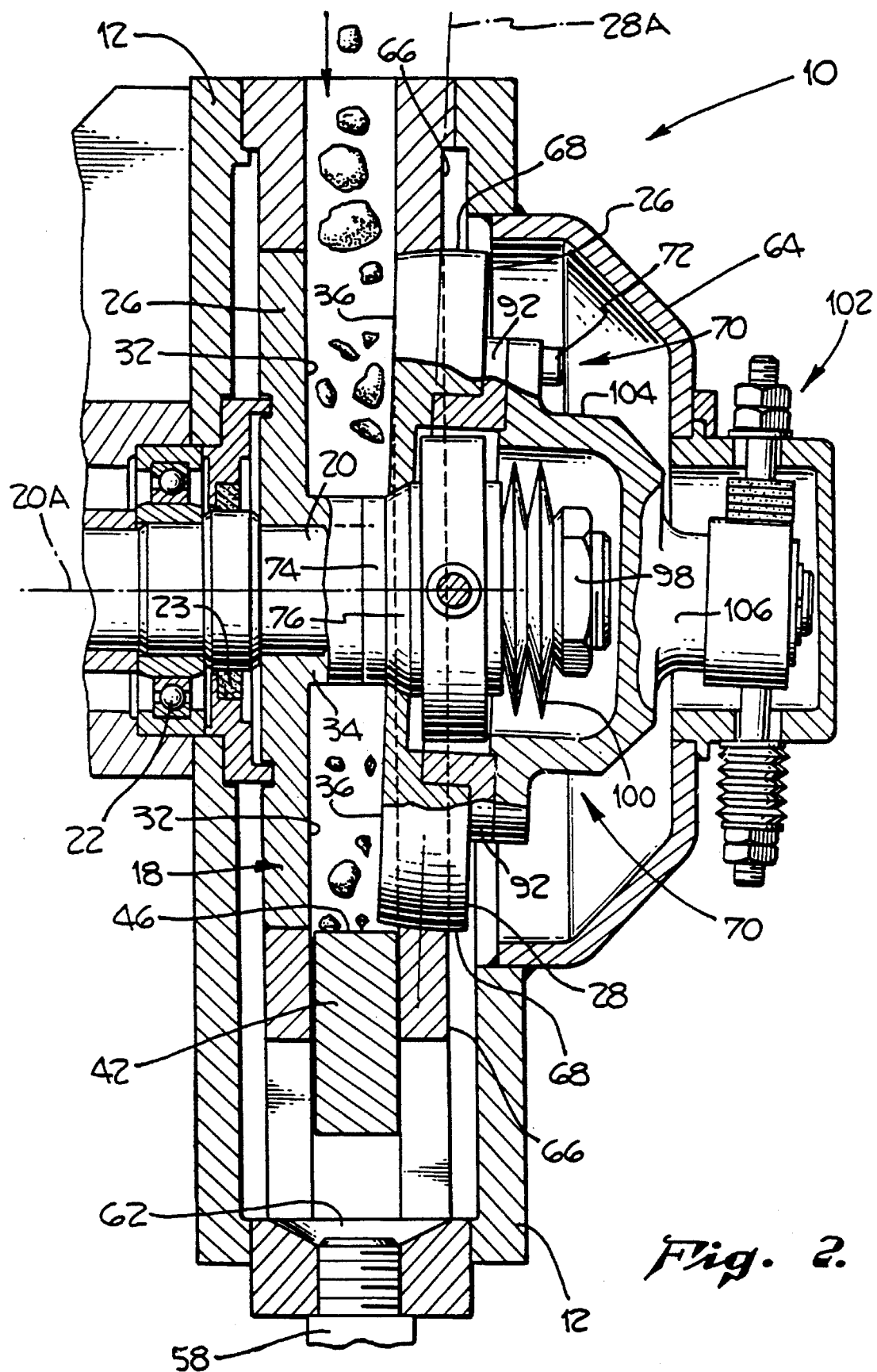
FIG. 2 is a partial transverse sectional view of the solids pump of FIG. 1 taken along line 2—2 showing one of the friction drive walls angled for rotation in a plane at an angle relative to an axis.

A first preferred exemplary apparatus in accordance with the present invention is shown generally at 10 in FIGS. 1 and 2. The apparatus 10 includes a housing 12, which includes an inlet 14 and outlet 16. Located within housing 12 is a material drive rotor 18. The drive rotor 18 is mounted on shaft 20, with shaft 20 being rotatably mounted within a conventional low-friction bearing assembly 22 for rotation about an axis 20A. Dust seal 23 is provided to keep dust out of the bearing 22. The shaft 20 is connected to a hydrostatic or electrically-driven motor (not shown). The shaft 20 is driven by the motor in the direction shown by arrow 24 in FIG. 1.

The drive rotor 18 includes two friction drive walls or disks, a left side disk 26 and a right side disk 28, as best shown in FIG. 2. Each side disk 26 and 28 forms one-half of the overall drive rotor 18 in one preferred embodiment. The drive rotor is made up of two separate drive disks in order to facilitate assembly of the solids pump, and so that the right disk 28 can be adjustably positioned in a plane, indicated at 28A in FIG. 2, relative to the axis 20A such that the distance between the left disk 26 and the right disk 28 is greater adjacent the inlet than the distance between the left disk and right disk downstream from the inlet between the inlet and the outlet for example, 180° from the inlet on the drive disks. The left drive disk 26 is secured to shaft 20 via a key element 30 (FIG. 1).

As best shown in FIG. 2, the interior surfaces of the drive rotor 18 include a left side surface or wall 32, a hub 34, and a right side surface or wall 36. The two side walls 32 and 36 are opposite each other to provide surfaces between which the particulate solids are compacted or form a bridge as the cross-sectional area between the walls decreases, e.g. as the distance between the walls decreases. This compaction results in bridging of the particles which facilitates transport. It should be noted that other opposing wall configurations are possible, while still maintaining an angled relationship for at least one wall, but the use of outwardly extending walls 32 and 36 as shown in FIGS. 1 and 2 is preferred. The two side walls 32 and 36, along with hub 34, which engages the solid material 38, is frictionally driven from the inlet 14 to the outlet 16.

The size of the drive rotor 18 may vary widely, depending upon the type and volume of material which is to be transported or metered. Typically, outside diameters for the drive disks 26 and 28 may range from a few inches to many feet. The smaller drive disks are well suited for use in transporting and metering relatively small volumes of solid material such as food additives and pharmaceuticals. The larger size disks may be utilized for transporting and metering large amounts of both organic and inorganic solid materials, including food stuffs, coal, gravel and the like. The apparatus is equally well suited for transporting and metering large and small particles and mixtures of them, and large and small volumes, and may be used to transport and meter both wet and dry particulate material with the only limitation being that the material cannot be so wet that viscous forces dominate so as to disturb bridging.

The apparatus 10 includes one or more exterior shoes such as those at 40 and 42. The exterior shoes 40 and 42 are designed to close the duct formed between the left side wall 32 and right side wall 36 of the drive rotor 18 as best shown in FIGS. 1 and 2. Each of the exterior shoes 40 and 42 includes a stationary inner wall 44 and 46, respectively. The interior walls of the shoes, in combination with the interior walls of the rotor 18, define the cross-sectional area of the duct at any given point. Both exterior shoes 40 and 42 are mounted to the housing by way of suitable mounting brackets or pins. The inner wall, or inner walls in the case of plural shoes, are arcuately formed so as to conform to the circular perimeter of the friction drive walls 32 and 36. Therefore, as the drive walls rotate with the shaft 20, the stationary wall of the shoe keeps the particulate matter being transported between the friction drive walls. In one preferred embodiment, the inner wall of the shoe extends axially (transversely of the shoe) beyond the left and right side walls 32 and 36, respectively, of the drive rotor so as to overlap the walls 32 and 36 of the rotor. The shoe is placed as close as possible, within acceptable tolerances, to the outer rims of the left and right side walls. In this configuration, the shoe is not radially adjustable to move closer or further away from the hub of the rotor to change the cross-sectional area of the duct defined between the left and right side walls.

In an alternative embodiment, the shoe may be axially sized and shaped so as to fit between the left and right side walls 32 and 36 to form a curved outer wall for the duct for transporting particulate material. In this configuration, the radial location of the shoe may be adjusted toward or away from the hub of the rotor so as to change the cross-sectional area of the duct. For this purpose, a screw adjuster may be connected to one or a plurality of shoes as shown in U.S. Pat. No. 4,988,239. The screw adjuster 50 shown there provides radially inward and outward adjustment of shoe 40 about a pivot pin 48. The inward and outward adjustment of shoe 40 allows setting up a choking or compaction of the solids as they move through the pump. A second screw adjuster 54 may be attached to a second shoe 42 shown in the '239 patent. The second screw adjuster is of the same type as the first and is provided to allow inward and outward radial adjustment of shoe 42. The inward and outward adjustment of shoe 42 would allow the size of the duct to be varied as the solids move through the pump after passing the first shoe 40 substantially independently of the angle of the second disk 26.

A dust drain 58 with an associated valve 60 is provided at the bottom of the housing for allowing removal of dust which may accumulate during pump operation. The valve 60 may be left open during pump operation to continually remove dust as it falls into the drain through an interior collection channel 62. Alternatively, the valve 60 may be left closed, and only opened when the collection channel 62 has filled with dust. The opening and closing of the valve 60 will, of course, depend upon the dustiness or friability of the particular solid material being transported. The right side of the housing 64 serves to contain dust generated during operation and to prevent contaminants from entering the housing. The right side of the housing 64 also serves to support and control the position of a pin or shaft, described more fully below, for defining the angle of the right disk. The housing 64 also allows access to the drive rotor 18 for assembly, inspection and disassembly of the unit.

The right side disk 28 is encircled by a plate 66 mounted around the inside of the housing and having a circular opening for accommodating the circular right drive disk 26. The circular opening in the plate 66 is defined by a wall extending from the duct side of the plate to the outside of the plate such that the wall diverges outwardly from the duct to accommodate the curved circumferential wall 68 of the right side disk. The circumferential surface 68 has a convex form, while the circular wall in the plate 66 has a concave configuration.

The right drive disk 28 is mounted to a gimbal assembly 70 for rotation in the plane 28A at an angle relative to the axis 20A such that the distance between the left and right side walls adjacent the inlet 14 is greater than the distance between the left and right side walls downstream from the inlet. The angled disk preferably runs at a fixed angle of up to 2° from the vertical, or put another way, the right drive disk rotates about an axis 70A preferably at an angle between 0° and 2° from the axis 20A of the shaft 20, as seen in FIG. 3.

Figure 3:
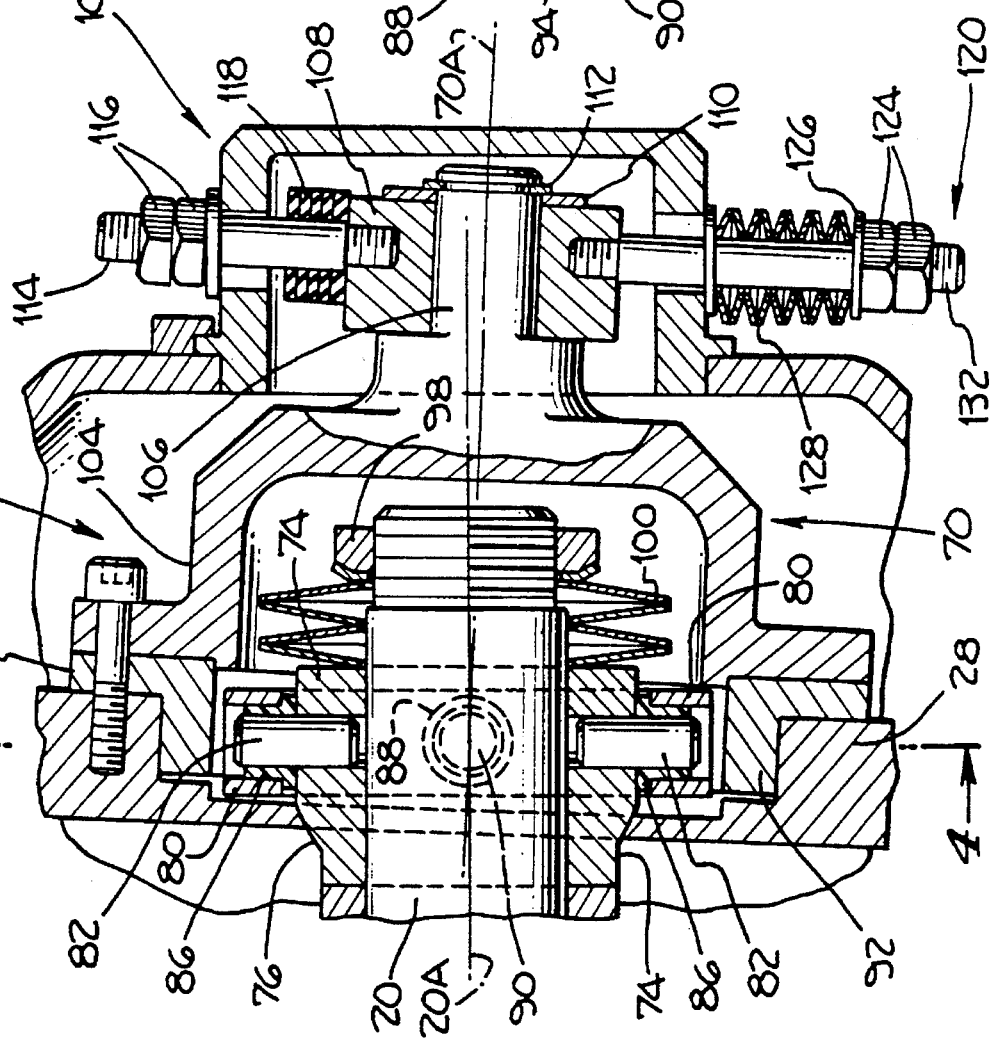
FIG. 3 is a detailed side section of a portion of the solids pump as shown in FIG. 2.

The right drive disk is preferably mounted to the gimbal assembly through regularly spaced mounting bolts 72, for example through a configuration of three equally spaced mounting bolts, one of which is shown in FIG. 3. The face of the right drive disk extends from a point at its circumferential wall 68 radially inward to the inner most circular point on the side wall adjacent a gimbal mounting hub 74 on the shaft 20. The hub 74 is fixed to and rotates with the shaft 20 and includes a convexly curved surface 76 extending around the circumference of the hub. The wall of the right side disk adjacent the hub is correspondingly curved to match the curved surface 76 on the hub to minimize the passage of particulate material past the side wall while still allowing movement of the right drive disk.

Figure 4:
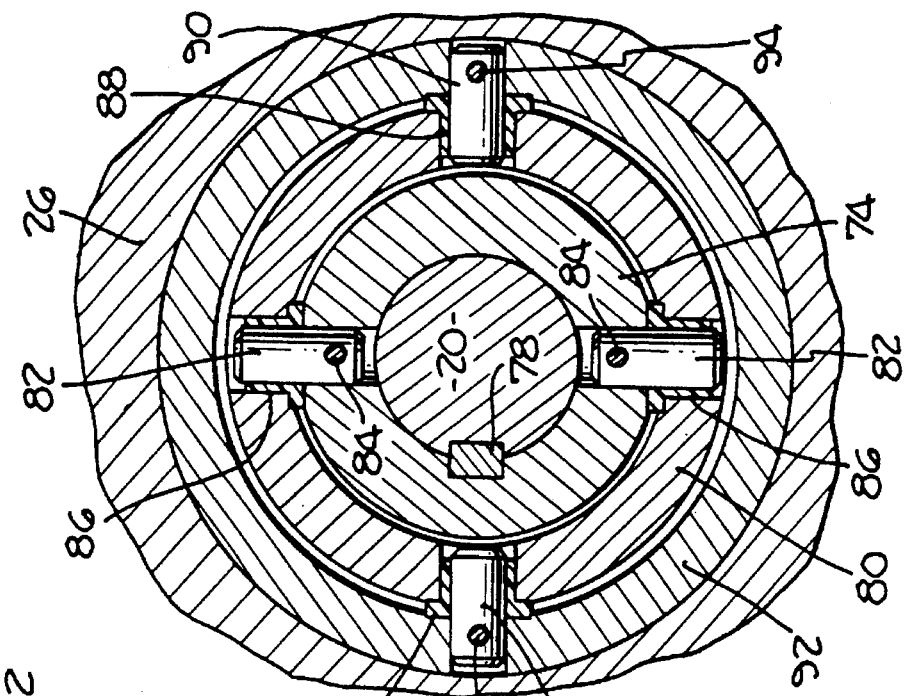
FIG. 4 is a partial transverse cross-section of the solids pump taken along line 4—4 of FIG. 3.

The hub 74 is fixed to the shaft 20 through a suitable key 78 (FIG. 4) so that the hub, and therefore the gimbal assembly and right drive disk, rotates with the shaft.

The gimbal assembly 70 includes a pair of concentrically arranged rings for allowing pivotal movement of the right side disk 28 about mutually perpendicular axes. The first inner ring 80 is pivotally mounted about the hub 74 through a pair of diametrically opposed pivot pins 82 fixed to the hub through pins 84. The pivot pins extend radially outward from the hub, the exposed portions of which are encircled by suitable sleeves 86. The sleeves are preferably made from the a suitable plastic or rubber to act as a bearing surface to minimize friction between the pin and the first inner ring 80 which rotates a limited amount about an axis defined by the pins 82. The sleeves 86 extend into and engage openings in the first inner ring 80.

A pair of diametrically opposed openings are also formed in the first, inner ring 80 90° apart from the first pivot pins 82 for accepting corresponding sleeves 88 and the ends of respective pivot pins 90 extending radially inwardly from a second, outer ring 92 concentric with the inner ring and which rotates about an axis defined by the second pivot pins 90. The second pivot pins are anchored by anchor pins 94 in suitable openings in the second inner ring to which is mounted the right drive disk 28.

The hub is retained on the shaft by a suitable fastener such as a hex nut 98. The hex nut is tightened down on the shaft over axial loading relief springs 100 biasing the hub 74 against a hub on the left drive wall 26.

The angle at which the right drive disk 28 rotates is determined by an angle setting assembly 102 engaging the housing 64 to control the angle. The angle setting assembly 102 includes a gimbal bracket 104 mounted to the spacer ring 96 through the same mounting bolts 72 which mount the right drive disk 28 to the gimbal assembly. The gimbal bracket 104 includes a shaft 106 coaxial with an imaginary line normal to the plane 28A centered on the right drive disk 28. Therefore, the location and orientation of the shaft 106 will determine the angular disposition of the right drive disk 26. As most clearly seen in FIG. 5, a bearing block 108 surrounds and supports the shaft 106. The bearing block is retained on the shaft by a washer 110 and a retaining ring 112.

The position of the bearing block 108 is determined and adjusted by an angle setting stud 114 passed through an opening in the housing 64 and threaded into the bearing block 108. The opening in the housing is large enough to allow movement of the angle setting stud as a function of the angle of offset of the shaft 106 from the center line of the shaft 20. The angle is set by adjusting the hex nuts 116. A zero angle stop 118 in the form of a spacer surrounds the angle setting stud 114 between the bearing block 108 and the internal surface of the housing 64 to limit the angle of the right drive disk 28 to an angle greater than or equal to 0° from a plane normal to the axis 20A. As a result, the angle of the right drive disk 28 will not be such that the distance between the left and right drive disks at the inlet is less than the distance between the two disks 180° around the drive disks from the inlet.

An angle overload limiter 120 is threaded into the bearing block 108 opposite the angle setting stud 114 to absorb any impact caused by transporting the particulate material and which would otherwise tend to reduce the angle of the right drive disk, and thereby reduce the driving force created by the drive disks. The angle overload limiter 120 includes a stud 122 threaded into the bearing block through an opening in the housing opposite the opening through which the angle setting stud 114 passes. The stud includes a pair of hex nuts 124 retaining a washer 126 and compression springs 128 biasing the shaft 106 in a manner to increase the angle between the shaft 106 and the shaft 20.

The apparatus in accordance with the present invention may be utilized for transporting particulate material against atmospheric pressure. In addition, the pump has been found useful in pumping solids into pressurized systems. Referring to FIGS. 1 and 2, it is important when pumping solids into pressurized systems that the entire cross-sectional area of outlet 16 be filled with solids during pumping. This forms a dam at the pump outlet which is a barrier to possible deleterious effects of reverse flow of gases or liquids back into the pump through the outlet.

Figure 5:
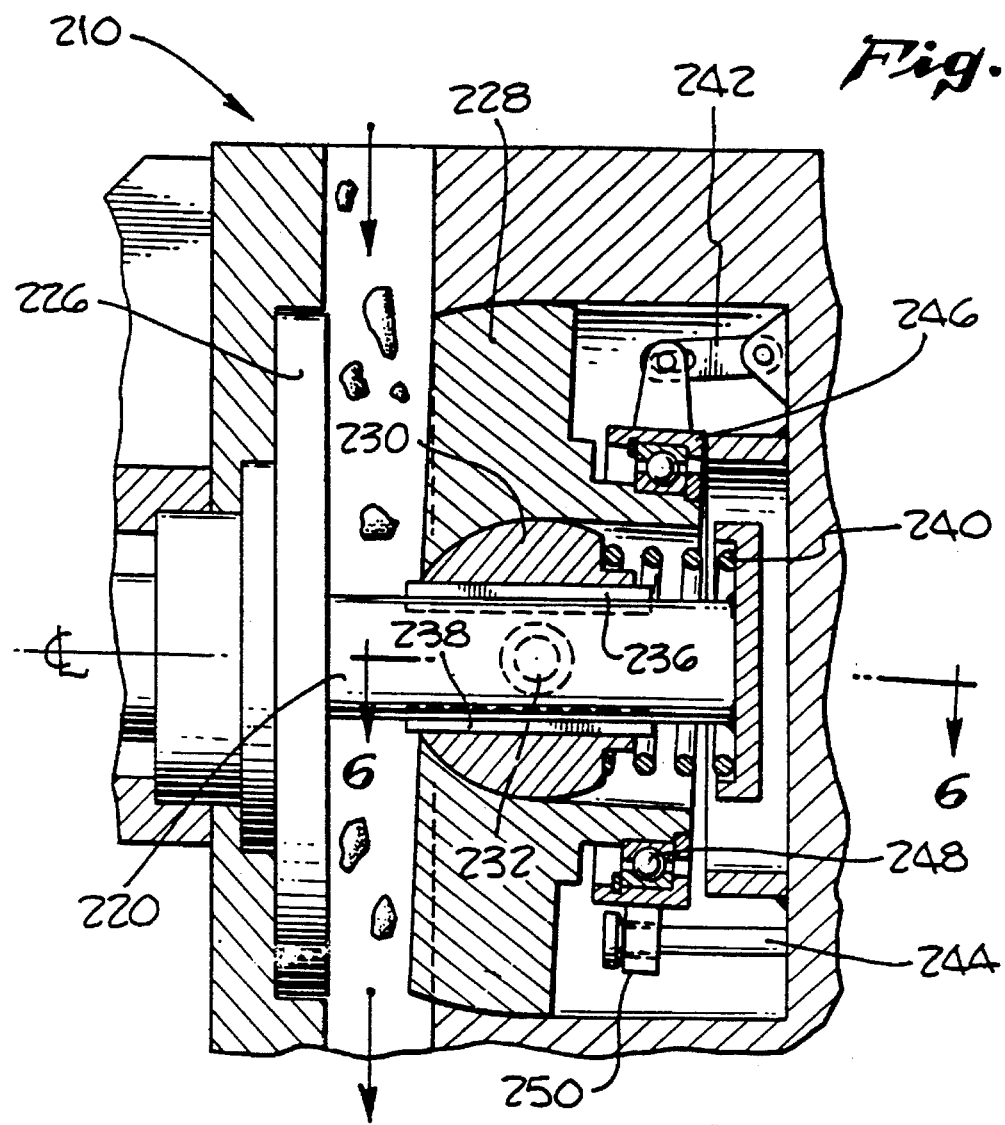
FIG. 5 is a partial sectional view of a second preferred exemplary solids pump for use in accordance with the present invention.
Figure 6:
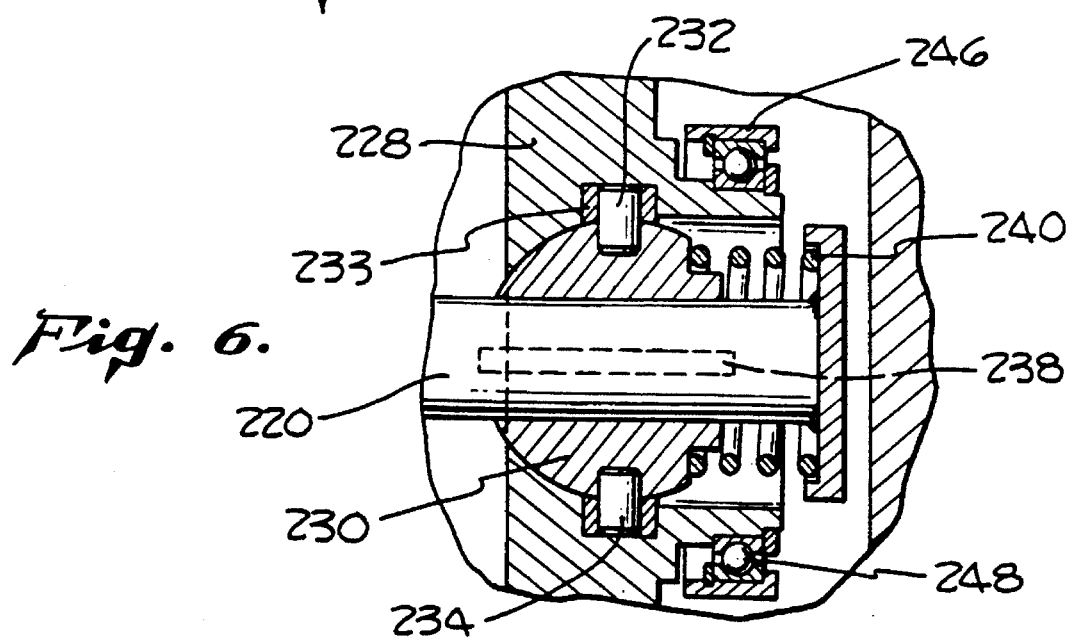
FIG. 6 is a partial transverse sectional view of the solids pump of FIG. 5 taken along line 6—6.

A second preferred exemplary apparatus in accordance with the present invention is shown generally at 210 in FIGS. 5 and 6. The apparatus 210 is basically the same as the first preferred exemplary apparatus 10 except that the mounting of drive disk 228 to the shaft 220 is accomplished in a preferred alternative manner. The second alternative embodiment 210 functions and operates in the same manner as the first embodiment 10 except for the mechanism used to provide angling of the right drive disk 228. For simplicity, the exterior shoes and details showing mounting of the left drive disk 226 are not shown.

The right drive disk 228 is mounted to shaft 220 on ball joint 230 to form a ball joint. The drive disk 228 is connected to the ball 230 via pinions 232 and 234 to provide desired angling of the disk 228 during rotation. The pins 232 and 234 are located in slot 233. Ball 230 is locked to shaft 220 utilizing keys 236 and 238. The keys 236 and 238 insure common rotation of disk 228 with shaft 220 while still allowing axial movement of the disk relative to shaft 220. A spring 240 is provided to continually bias the disk 228 towards the left disk 226. Means for adjusting the angled position of disk 228 are provided by upper control arm 242 and lower control peg 244. The control arm 242 and control peg 244 are attached to a housing 246 which is connected to the right disk 228 via bearing 248. The housing 246 includes an opening 250 through which lower control peg 244 is mounted to allow sliding movement of the housing 250 over control peg 244. As shown in FIG. 6, during overload conditions, the angled disk 228 may be shifted to a parallel position wherein the housing 250 has been forced back along lower peg 244.

Figures 7, 8:
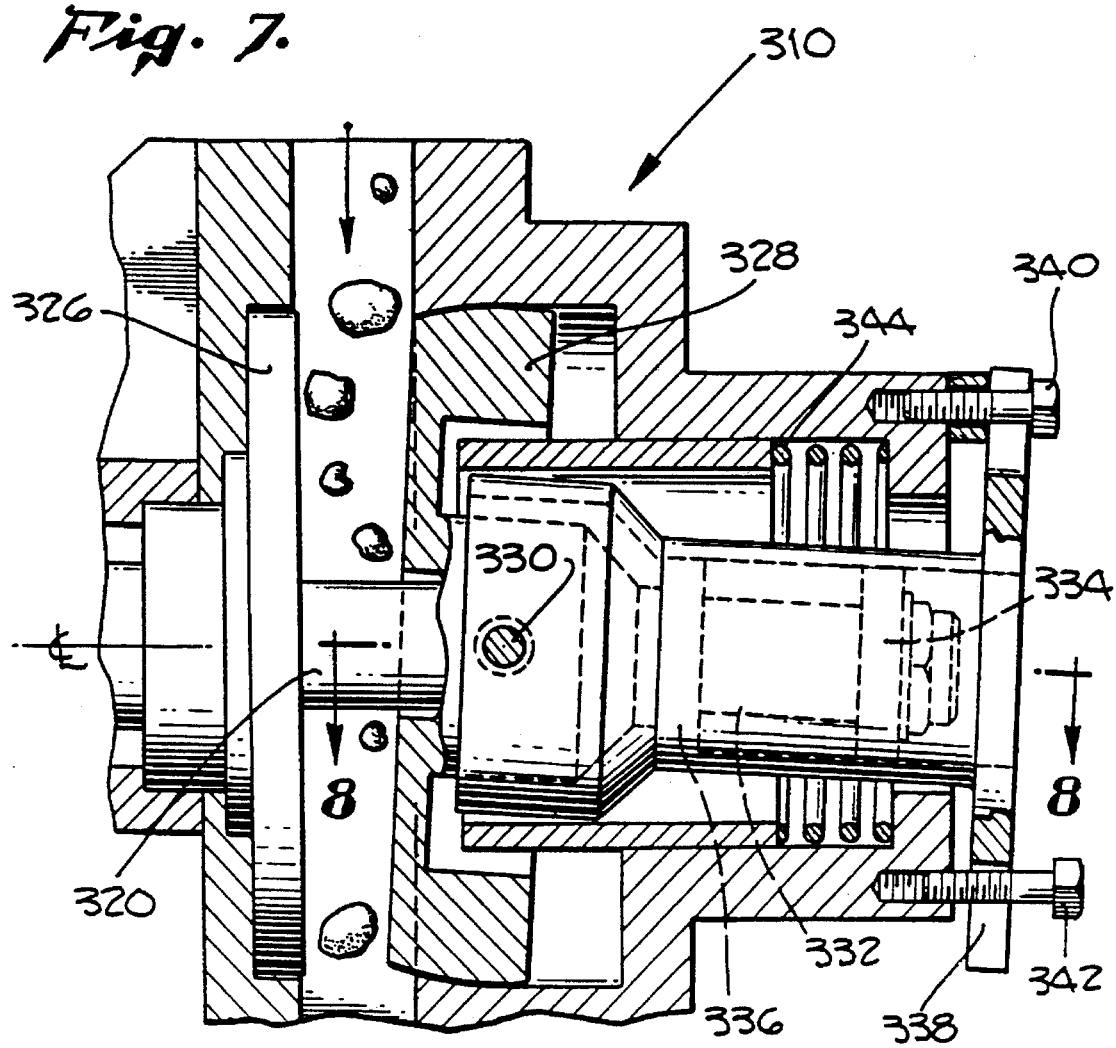
FIG. 7 is a partial transverse sectional view of a third preferred exemplary solids pump for use in accordance with the present invention.
FIG. 8 is a partial transverse cross-sectional view of the solids pump of FIG. 7 taken along line 8—8.

A third preferred exemplary embodiment in accordance with the present invention is shown generally at 310 in FIGS. 7 and 8. This particular embodiment functions and operates the same as the previous two preferred exemplary embodiments except for the manner in which right drive disk 328 is mounted to shaft 320. The drive disk 328 is mounted to shaft 320 by way of drive pin 330. The disk 328 is free to rotate about pin 330.

The disk 328 includes an extension shaft 332 which is mounted by way of bearings 334 and 336 to adjustment housing 338. Upper adjustment bolt 340 and lower adjustment bolt 342 are provided to adjust the angled position of the right drive disk 328. Spring 344 is provided to continually bias the right disk 328 toward the left disk 326. The spring 344 is shown in a semi-compressed state in FIG. 8 wherein the right drive disk 328 has been forced into a parallel position due to overload conditions. The spring 344 provides bias against the right drive disk 328 via a housing 350 which is connected to control arm 338 by way of pins 352 and 354.

Although the preferred exemplary embodiments have been shown utilizing a single drive rotor, it is also possible to provide transport apparatus having multiple drive rotors which receive material from a single or multiple inlets. The use of multiple drive rotors provides for increased material through-put without having to increase the diameter of the rotor disk.

Once the pump is set up for operation, adjustments of the shoe position should not be necessary. If jamming of the pump does occur, the right drive disk may be conveniently removed through the opening covered by housing cap. This provides immediate access to the passageway to allow quick clean out of any blockage.

The bridging of solids which occurs in the chokes as the solids pass through the pump results in a positive displacement of the solids. Accordingly, the pump may be used both as a transport and metering device. Due to the positive displacement of solids through the pump, metering is accomplished by measuring the rate of rotation of the drive rotor and calculating the amount of solids flow through the pump based upon the cross-sectional area of the duct at its narrowest point. When used as a metering pump, it is desirable that some type of conventional detection device be utilized to ensure that the passageway remains full of solids at all times during solids metering. Such conventional detection devices include gamma ray and electromechanical detectors. These detectors are all well known in the art and are neither shown in the drawings nor described in detail.

The degree to which the particulate material is compacted in the pump will vary widely depending upon the materials being conveyed, pump rotation speed and whether or not the solids are being pumped against a pressure head. The apparatus elements are preferably made of high strength steel or other suitable material. The drive disks and interior walls of the shoes should be made of a metal or other material which resists abrasion by the material as it is driven through the unit. This is especially true for the adjustable or stationary shoes and their interior faces over which the solid material continually passes.

The apparatus of the present invention is also well suited for metering slugs or plugs of solid material into a flowing pipeline system or other system where discrete repetitive introduction of material is required. The accurate control of transport and metering which is achieved allows pulsed delivery of discrete amounts of particulate material into both pressurized and unpressurized systems.

Having thus described exemplary embodiments of the present invention, it should be understood by those skilled in the art that the above disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A system for transporting particulate material comprising:

a housing having a wall defining an inlet and a wall defining an outlet spaced downstream from the inlet;

a duct enclosed in the housing between said inlet and outlet, said duct being formed between first and second substantially opposed friction drive walls movable relative to said housing from said inlet towards said outlet and at least one arcuate wall extending between said inlet and said outlet, said friction drive walls having a greater surface area for contacting a plurality of particulates than said at least one arcuate wall;

means for rotating the friction drive walls relative to an axis;

means for positioning the second friction drive wall in the housing for rotation in a plane at an angle relative to the axis such that particulates introduced into said duct at said inlet are compacted downstream of said inlet between said inlet and said outlet sufficiently to form a bridge of particulates spanning the width of said duct; and a plurality of particulates having properties such that, upon compaction within said duct, said particulates form a bridge which spans the width of said duct, said bridge of particulates engaging said friction drive walls such that the friction forces created by rotation of said friction drive walls transports said particulates within said duet toward said outlet.

2. The system of claim 1 wherein the rotating means includes a shaft wherein the first friction drive wall is substantially rigidly fixed to the shaft for rotation with the shaft.

3. The system of claim 2 wherein the second friction drive wall is movably mounted to the shaft for rotation with the shaft and wherein the second friction drive wall rotates in a plane at an angle relative to the axis.

4. The system of claim 3 further comprising means for adjusting the angle of the second friction drive wall relative to the axis.

5. The system of claim 4 wherein the adjusting means can adjust the angle at least to be between eighty-eight degrees and ninety degrees from the axis.

6. The system of claim 1 wherein the means for positioning the second friction drive wall includes a universal joint to allow the second friction drive wall to rotate in a plane at an angle relative to the axis.

7. A system for transporting particulate material comprising:

a housing having a wall defining an inlet and a wall defining an outlet spaced downstream from the inlet;

a duct enclosed in the housing between said inlet and outlet, said duct being formed between first and second substantially opposed friction drive walls movable relative to said housing from said inlet towards said outlet and at least one arcuate wall extending between said inlet and said outlet, said friction drive walls having a greater surface area for contacting a plurality of particulates than said at least one arcuate wall;

a shaft for rotating the friction drive walls relative to an axis;

means for positioning the second friction drive wall in the housing for rotation in a plane at an angle relative to the axis such that particulates introduced into said duct at said inlet are compacted downstream of said inlet between said inlet and said outlet sufficiently to form a bridge of particulates spanning the width of said duct; and a plurality of particulates having properties such that, upon compaction within said duct, said particulates form a bridge which spans the width of said duct, said bridge of particulates engaging said friction drive walls such that the friction forces created by rotation of said friction drive walls transport said particulates within said duct toward said outlet;

wherein the means for positioning the second friction drive wall includes a gimbal for mounting the second friction drive wall to the shaft.

8. The system of claim 1 wherein the means for positioning the second friction drive wall includes means for adjusting the angle of rotation of the second friction drive wall.

9. The system of claim 8 wherein the means for adjusting includes means for preventing the angle between the axis and the second friction drive wall from being greater than ninety degrees and preventing the distance between the first and second friction drive walls adjacent the inlet from being less than the distance adjacent the outlet.

10. The system of claim 8 further comprising means for biasing the rotation of the second friction drive wall to be in a plane at an angle less than eighty-eight degrees.

11. A system for transporting particulate material comprising:

a housing having a wall defining an inlet and a wall defining an outlet spaced downstream from the inlet;

a duct enclosed in the housings between said inlet and outlet, said duct being formed between first and second substantially opposed friction drive walls movable relative to said housing from said inlet towards said outlet and at least one arcuate wall extending between said inlet and said outlet, said friction drive walls having a greater surface area for contacting a plurality of particulates than said at least one arcuate wall;

a shaft for rotating the friction drive walls relative to an axis;

means for positioning the second friction drive wall in the housing for rotation in a plane at an angle relative to the axis such that particulates introduced into said duct at said inlet are compacted downstream of said inlet between said inlet and said outlet sufficiently to form a bridge of particulates spanning the width of said duct; and a plurality of particulate having properties such that, upon compaction within said duct, said particulates form a bridge which spans the width of said duct, said bridge of particulates engaging said friction drive walls such that the friction forces created by rotation of said friction drive walls transport said particulates within said duct toward said outlet;

wherein the means for positioning the second friction drive wall includes means for adjusting the angle of rotation of the second drive wall;

said system further comprising means for biasing the rotation of the second friction drive wall to be in a plane at an angle less than eighty-eight degrees;

wherein the means for positioning the second friction drive wall includes a gimbal for mounting the second friction drive wall to the shaft, a gimbal shaft for supporting the gimbal, and a sleeve for supporting the gimbal shaft and wherein the biasing means includes a spring supported by a bolt extending between the sleeve and the housing.

12. A system for transporting particulate material comprising:

a housing having a wall defining an inlet and a wall defining an outlet spaced downstream from the inlet;

a duct enclosed in the housing between said inlet and outlet, said duct being formed between first and second substantially opposed friction drive walls movable relative to said housing from said inlet towards said outlet and at least one arcuate wall extending between said inlet and said outlet, said friction drive walls having a greater surface area for contacting a plurality of particulates than said at least one arcuate wall;

means for rotating the friction drive walls relative to an axis;

means for positioning the second friction drive wall in the housing for rotation in a plane at an angle relative to the axis such that particulates introduced into said duct at said inlet are compacted downstream of said inlet between said inlet and said outlet sufficiently to form a bridge of particulates spanning the width of said duct; and a plurality of particulates having properties such that, upon compaction within said duct, said particulates form a bridge which spans the width of said duct, said bridge of particulates engaging said friction drive walls such that the friction forces created by rotation of said friction drive walls transport said particulates within said duct toward said outlet;

wherein the means for positioning the second friction drive wall includes means for adjusting the angle of rotation of the second drive wall;

said system further comprising means for biasing the rotation of the second friction drive wall to be in a plane at an angle less than eighty-eight degrees;

wherein the means for positioning the second drive wall includes a ball joint.

13. The system of claim 1 wherein the first friction drive wall is positioned in the housing for rotation substantially perpendicular to the axis.

14. An system for transporting particulate material comprising:

a housing having a wall defining an inlet and a wall defining an outlet spaced from the inlet;

a duct enclosed in the housing between said inlet and outlet, said duct being formed between first and second substantially opposed action drive walls movable relative to said housing from said inlet towards said outlet and at least one arcuate wall extending between said inlet and said outlet, said friction drive walls having a greater surface area for contacting a plurality of particulates than said at least one arcuate wall;

means for rotating the friction drive walls relative to an axis;

means for adjustably positioning the second friction drive wall in the housing for rotation in a plane at an angle relative to the axis such that particulates introduced into said duct at said inlet are compacted downstream of said inlet between said inlet and said outlet sufficiently to form a bridge of particulates spanning the width of said duct; and a plurality of particulates having properties such that, upon compaction within said duct, said particulates form a bridge which spans the width of said duct, said bridge of particulates engaging said friction drive walls such that the friction forces created by rotation of said friction drive walls transports said particulates within said duct toward said outlet.

15. A system for transporting a plurality of particles of varying size, said system comprising:

a housing having a particle inlet for receiving said particles, and a particle outlet for expelling said particles;

first and second rotatable disks defining first and second friction drive walls spaced apart to define a duct between said inlet and said outlet, said first and second friction drive walls being movable relative to said housing from said inlet towards said outlet, for forming a bridge of a plurality of said particles spanning from said first friction drive wall to said second friction drive wall and for moving said bridge of particles within said duct toward said outlet;

disk support means for supporting said first rotatable disk for rotation about a first axis and for supporting said second rotatable disk for rotation about a second axis directed at an angle relative to the first axis.

16. A system as recited in claim 15, wherein said inlet comprises means for receiving a relatively unorderly flow of said particles.

17. A system for transporting a plurality of particles of varying size, said system comprising:

a housing having a particle inlet for receiving said particles, and a particle outlet for expelling said particles;

first and second rotatable disks defining first and second friction drive walls spaced apart to define a duct between said inlet and said outlet, said first and second friction drive walls being movable relative to said housing from said inlet towards said outlet, for forming a bridge of a plurality of said particles spanning from said first friction drive wall to said second friction drive wall and for moving said bridge of particles within said duct toward said outlet;

disk support means for supporting said first rotatable disk for rotation about a first axis and for supporting said second rotatable disk for rotation about a second axis directed at an angle relative to the first axis;

wherein said disk support means comprises a drive shaft extending through each of said first and second disks, said drive shaft defining an axis of rotation in common with said first axis of rotation, wherein said first disk is coupled to the drive shaft for rotation about the axis of the drive shaft and said second disk is pivotally coupled to the drive shaft for rotation about the second axis angled relative to the first axis of rotation.

18. A system for transporting a plurality of particles of varying size, said system comprising:

a housing having a particle inlet for receiving said particles, and a particle outlet for expelling said particles;

first and second rotatable disks defining first and second friction drive walls spaced part to define a duct between said inlet and said outlet, said first and second friction drive walls being movable relative to said housing from said inlet towards said outlet, for forming a bridge of a plurality of said particles spanning from said first friction drive wall to said second friction drive wall and for moving said bridge of particles within said duct toward said outlet;

disk support means for supporting said first rotatable disk for rotation about a first axis and for supporting said second rotatable disk for rotation about a second axis directed at an angle relative to the first axis;

wherein said disk support means comprises a drive shaft common to both said first and second disks, said drive shaft defining an axis of rotation in common with said first axis of rotation, wherein said first disk is coupled to the drive shaft for rotation about the axis of the drive shaft and said second disk is pivotally coupled to the drive shaft for rotation about the second axis angled relative to the first axis of rotation.

19. A system as recited in claim 18, wherein said second disk is coupled to said drive shaft by a pair of concentrically arranged rings comprising a first ring pivotally coupled to drive shaft for pivotal motion about a first ring pivot axis and a second ring concentrically located relative to the first ring and pivotally coupled to the first ring for pivotal motion about a second ring pivot axis, said second ring being fixed relative to said second disk, said first and second ring pivot axes being substantially 90 degrees apart.

20. A system as recited in claim 18, wherein said second disk is coupled to said drive shaft by a ball joint.

21. A system as recited in claim 18, wherein said second disk is coupled to said drive shaft with a pin extending radially outward from said drive shaft and coupled to said second disk, said pin defining a pin axis about which said second disk is supported for pivotal motion.

22. A system as recited in claim 15, further comprising angle setting means for setting the angle between said first and second axes so as to set a minimum duct width between said first and second disks, said angle setting means inhibiting said second disk from moving in a direction which reduces the duct width from the set minimum duct width so as to define a set minimum gap between the first and second disks in the duct.

23. A system as recited in claim 15, wherein said disk support means supports said disks with the angle between said first and second axes being small enough to maintain a gap between the first and second disks in the duct.

24. A system as recited in claim 23, wherein said angle between said first and second axes is no more than about 2 degrees.

25. A system as recited in claim 15, further comprising angle setting means for adjusting and setting the angle between said first and second axes to a value small enough to maintain a set minimum gap between the first and second disks in the duct.

26. A system as recited in claim 25, wherein said angle setting means sets the angle between said first and second axes to be no more than about 2 degrees.

27. A system for transporting a plurality particles of varying size, said system comprising:

a housing having a particle inlet for receiving said particles, and a particle outlet for expelling said particles;

first and second rotatable disks defining first and second friction drive walls spaced part to define a duct between said inlet and said outlet, said first and second friction drive walls being movable relative to said housing from said inlet towards said outlet, for forming a bridge of a plurality of said particles spanning from said first friction drive wall to said second friction drive wall and for moving said bridge of particles within said duct toward said outlet;

disk support means for supporting said first rotatable disk for rotation about a first axis and for supporting said second rotatable disk for rotation about a second axis directed at an angle relative to the first axis;

wherein said second disk has an outer circumferential surface which is curved in the axial direction of the second disk and said housing defines a surface adjacent said curved outer circumferential surface, said housing surface being curved to substantially align with the curve of said outer circumferential surface so as to allow angular displacement of said second disk axis of rotation and to inhibit particles from passing between said outer circumferential surface and said curved housing surface.

28. A system as recited in claim 15, further comprising means for rotating said first and second disks at a rotational speed suitable for maintaining at least a portion of the duct full of particles at all times so as to pass particles from the outlet at a metered rate dependent upon the rotational speed of the disks and the duct cross section area at particle filled portion of the duct.

29. A system for transporting a plurality of particles of varying size, said system comprising:

a housing having a particle inlet for receiving a generally unorganized flow of said particles, and a particle outlet for expelling said particles;

first and second friction drive walls spaced apart to define a duct between said inlet and said outlet, said first and second friction drive walls being movable relative to said housing from said inlet towards said outlet, for forming a bridge of a plurality of said particles spanning from said first friction drive wall to said second friction drive wall and for moving said bridge of particles within said duct toward said outlet; and means for supporting said first drive wall for movement in a first plane from said inlet towards said outlet and for supporting said second drive wall for movement in a second plane from said inlet towards said outlet, said second plane being oriented at an angle relative to the first plane.

30. A method for transporting a plurality of particles of varying size between a pair of rotatable disks defining first and second drive walls spaced apart to a define a duct, said method comprising the step of:

supporting the first and second disks for rotation about first and second axes, respectively, wherein the second axis is at an angle relative to the first axis;

receiving the particles in the duct between the disks;

rotating the disks about their respective axes of rotation;

forming a bridge of a plurality of said particles spanning from said first drive wall to said second drive wall, wherein two particles of the plurality of particles which form the bridge define two respective bridge ends;

frictionally engaging the two ends of the particle bridge with the first and second drive walls, respectively, for moving said bridge of particles within said duct as the disks are rotated.

31. A method as recited in claim 30, wherein said step of receiving particles comprises the step of receiving a relatively unorderly flow of said particles within the duct.

* * * * *